June 22, 1965   F. REIFENHÄUSER   3,189,941
APPARATUS FOR CONTINUOUS EXTRUSION OF
COMPOSITE BODIES OF PLASTIC MATERIAL
Filed July 19, 1962   2 Sheets-Sheet 1
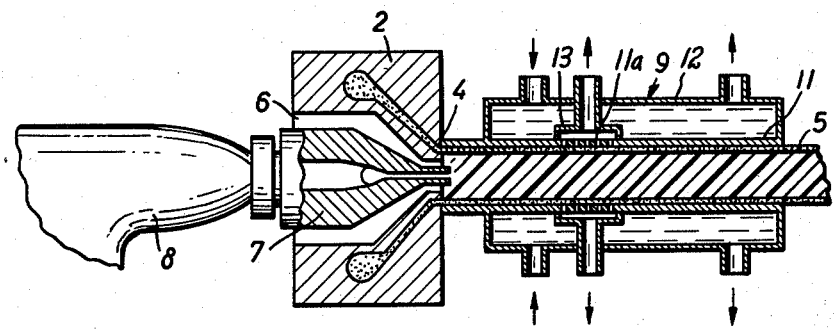
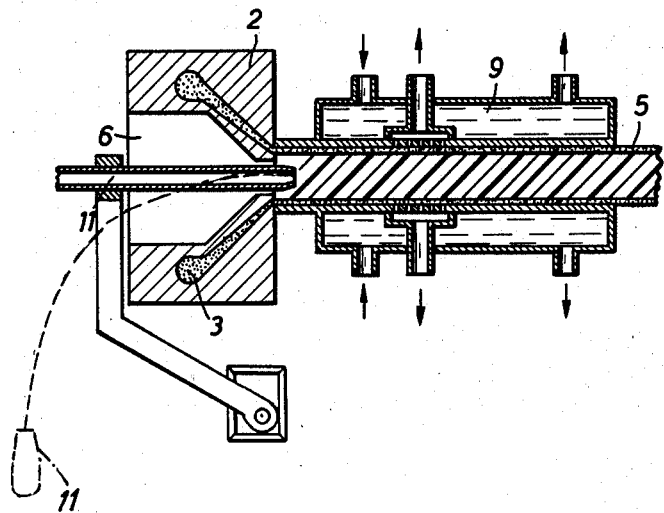
INVENTOR
FRIEDRICH REIFENHÄUSER
BY
ATT'Y.

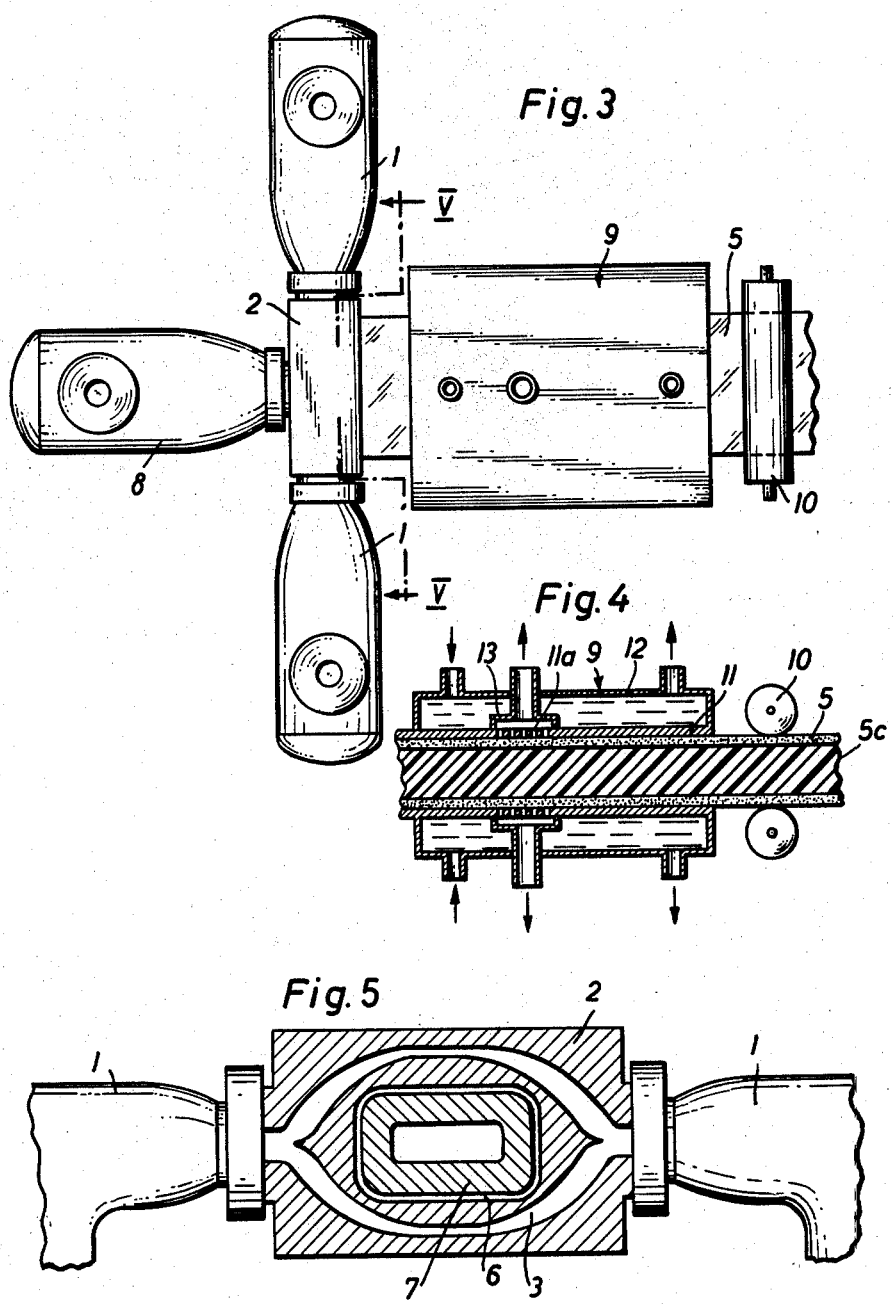

3,189,941
APPARATUS FOR CONTINUOUS EXTRUSION OF COMPOSITE BODIES OF PLASTIC MATERIAL
Friedrich Reifenhäuser, Troisdorf-Cologne, Germany, assignor to Reifenhäuser K.G., Troisdorf-Cologne, Germany
Filed July 19, 1962, Ser. No. 211,031
4 Claims. (Cl. 18—13)

The present invention is concerned with an improvement of an apparatus with a nozzle arranged concentrically in an extrusion head for the continuous extrusion of endless formed bodies, in particular of plate-like building elements which are comprised of a noise and heat dampening and insulating core of extrudable foamed filling material and a surrounding shell or jacket of thermoplastic synthetic material. There is here presented an improvement and elaboration of the proposals of Friedrich Reifenhäuser U.S. patent application Ser. No. 56,087 filed September 8, 1960 and now abandoned.

In accordance with prior practice represented by the above named patent application, the nozzle or nozzles for the core-forming light filling material, centrally disposed in the extrusion head of an extrusion press, are enclosed by a slit nozzle advantageously of flat prismatic cross section for the production of the shell.

From such nozzles the materials for the shell and the core are discharged simultaneously; and in addition immediately behind these nozzles is disposed a somewhat box-like calibrating apparatus of form known to the art, in which the still plastically formable hollow body, issuing from the extrusion head and intended as a shell, is caused to lie against or conform to the inner wall of the sizing device through the action of vacuum applied to the shell exterior surface. Also in a known arrangement, behind the sizing apparatus, beyond a cooling device, there is located a product withdrawal mechanism and at times a cut off apparatus as well.

It is now found that this proposal can be elaborated and improved by disposing one, two or more screw presses for the production of the external shell laterally of the common extrusion head at about right angles to the extrusion direction or in diametrically opposed relation to one another, and discharging into the extrusion canal leading to the common extrusion nozzle for the shell; and in this case the extrusion head is provided with a central aperture, on one side standing in direct connection with the hollow space of the extruded shell and on the other expanding outwardly into a conically shaped opening, into which may be introduced a core-producing extrusion nozzle.

This arrangement has the advantage that the central part of the injection head, in communication with the hollow space of the extruded hollow body, is open and accessible from the exterior.

Accordingly, in this central opening there may be selectively disposed the extrusion head of an extrusion machine or even a swiveling extrusion head which can also be removed during operations. The introduction of material from opposite sides further renders it possible to supply relatively large quantities of these materials to the extrusion head and thereby either to accelerate production or to produce flat bodies of considerable wall thickness, as may be necessary for certain intended applications.

Other objects and advantages will appear from the following description and the drawings, representing examples of an embodiment of the invention, wherein:

FIG. 1 in schematic representation is a longitudinal section through the apparatus with the extrusion nozzle of a screw press extrusion machine centrally located therein;

FIG. 2 is a similar longitudinal section, showing, however, a swiveled nozzle introduced in the central opening;

FIG. 3 is a plan view of the apparatus as shown in FIG. 1;

FIG. 4 is a longitudinal section through the sizing and cooling device with product withdrawal mechanism; and FIG. 5 is a cross section through the extrusion nozzle taken as indicated by the line V—V in FIG. 3.

The apparatus (see FIGS. 1, 3 and 5) is comprised of the oppositely disposed screw presses 1 which are attached to the common extrusion head 2 having an annular supply channel 3 through which the shell-forming plastic material is led to the extrusion nozzle 4 of closed slit-like form, from which issues the extruded hollow body 5.

In this common extrusion head there is provided a central hollow free space 6 into which the extrusion nozzle 7 of a screw press 8 can be introduced, for injecting the desired core or filler material 5C into the hollow space of the simultaneously extruded hollow body.

The hollow body is further formed through the sizing and cooling section 9 standing under a vacuum, and after cooling and solidification therein is continually drawn off through a withdrawal mechanism including the rolls 10 (see also FIG. 4). The rolls 10 preferably are driven by any of the many known apt means (not shown) at a speed suitable, relative to the rate at which material is supplied to and extruded by the apparatus, to provide a desired wall thickness in the shell portion 5 and compactness in the core 5C.

In the apparatus section 9, the tube 11, aligned with the nozzle 4 of and abutting the head body 2, has an interior wall surface corresponding to the external cross-sectional shape desired in the shell 5, and is provided with a water or coolant jacket 12 thereby to form cooling means; and at 11a has a portion of its length provided with a large number of perforations about its entire circumference, through which a vacuum is applied to the exterior of shell 5 as it is being produced, through a surrounding vacuum collar or jacket 13, serving to draw the yet plastically deformable shell material into conformity with the inner surface of tube 11 and thereby forming product sizing or calibrating means.

In the example of FIG. 2, into the hollow space 6 of the extrusion head 2 there extends a swiveling extrusion tube 11 upon removal of which the interior space of the extruded hollow body 5 is accessible from the exterior of the apparatus.

I claim:
1. For the continuous extrusion of shaped bodies, particularly plate-like construction elements having an extruded foamed sound and heat insulating core and a surrounding thermoplastic synthetic plastic shell, apparatus comprising:
   an extrusion head;
   a separate core material extrusion nozzle means disposed in said extrusion head;
   slit nozzle means in the head concentrically surrounding the first means and having a flat prismatic cross section for the extrusion of a hollow body as the said shell;
   said apparatus adapted for simultaneous discharge of the shell and core materials;
   a sizing device disposed immediately beyond said nozzle means adapted to apply a vacuum on the external surface of a hollow body issuing from the extrusion head while yet plastically deformable to bring the same into conformity with a size calibrating inner wall of the sizing device;
   a screw press for supplying to the slit nozzle means material for the hollow body and disposed laterally of the extrusion head;

said extrusion head having therethrough a central opening in communication on one side with the interior space of the hollow body extruded from the slit nozzle means and on the other side conically expanding to the exterior of the head;

said core producing extrusion nozzle means being structurally independent of said slit nozzle means and movable into and out of a core-filling operative disposition in said central opening.

2. An apparatus improvement as described in claim 1 wherein the extrusion nozzle means for the foamable core material is swivelly mounted for introduction to and withdrawal from said head without disturbing said slit nozzle means.

3. An apparatus improvement as described in claim 1 including a plurality of said screw presses discharging into a common extrusion channel supplying said slit nozzle means.

4. An apparatus as described in claim 3 including at least two of said presses disposed on said head in opposed relation to each other.

References Cited by the Examiner

UNITED STATES PATENTS

| 1,933,212 | 10/33 | Gora | 18—12 |
| 1,934,647 | 11/33 | State et al. | 18—12 |
| 2,243,116 | 5/41 | Ostermann | 18—8 |
| 2,337,927 | 12/43 | Reichel | 18—14 |
| 2,449,625 | 9/48 | Stuart | 18—12 |
| 2,569,373 | 9/51 | Fay | 18—13 |
| 2,687,553 | 8/54 | Colomba | 18—13 |
| 2,716,778 | 9/55 | Beare | 18—13 |
| 2,762,739 | 9/56 | Weiss | 18—59 |
| 2,789,315 | 4/57 | Pistor et al. | 18—8 |
| 2,807,833 | 10/57 | Schanz | 18—12 |
| 3,099,859 | 8/63 | Eilersen | 18—12 |

FOREIGN PATENTS

| 207,302 | 1/60 | Austria. |
| 880,391 | 10/61 | Great Britain. |
| 503,415 | 12/54 | Italy. |

WILLIAM J. STEPHENSON, *Primary Examiner.*

ROBERT F. WHITE, MICHAEL V. BRINDISI,
*Examiners.*